United States Patent
Young et al.

(10) Patent No.: US 10,637,651 B2
(45) Date of Patent: Apr. 28, 2020

(54) SECURE SYSTEMS AND METHODS FOR RESOLVING AUDIO DEVICE IDENTITY USING REMOTE APPLICATION

(71) Applicant: Bose Corporation, Framingham, MA (US)

(72) Inventors: Douglas Warren Young, Arlington, MA (US); Prasanna Rao, Boston, MA (US); Jim Lambert, Milford, MA (US); Niall Tone Kavanagh, Sharon, MA (US); Matthew Jannace, Bedford, MA (US)

(73) Assignee: Bose Corporation, Framingham, MA (US)

( * ) Notice: Subject to any disclaimer, the term of this patent is extended or adjusted under 35 U.S.C. 154(b) by 229 days.

(21) Appl. No.: 15/982,745

(22) Filed: May 17, 2018

(65) Prior Publication Data

US 2019/0356478 A1 Nov. 21, 2019

(51) Int. Cl.
*H04L 9/08* (2006.01)
*H04W 76/14* (2018.01)
*G06F 3/16* (2006.01)

(52) U.S. Cl.
CPC ............ *H04L 9/0819* (2013.01); *G06F 3/165* (2013.01); *H04L 9/0866* (2013.01); *H04W 76/14* (2018.02)

(58) Field of Classification Search
CPC ..... H04L 9/0819; H04L 9/0866; H04L 63/08; G06F 3/165; H04W 76/14; H04W 4/80; H04W 12/003
See application file for complete search history.

(56) References Cited

U.S. PATENT DOCUMENTS

| 7,742,740 B2 | 6/2010 | Goldberg et al. |
| 7,865,137 B2 | 1/2011 | Goldberg et al. |

(Continued)

FOREIGN PATENT DOCUMENTS

| EP | 2645665 | 10/2013 |
| GB | 2382952 A | 6/2003 |
| GB | 2494550 | 3/2013 |

OTHER PUBLICATIONS

Chen et al.; "Privacy-Preserving Large-Scale Location Monitoring Using Bluetooth Low Energy", 2015, IEEE, pp. 69-78. (Year: 2015).*

(Continued)

*Primary Examiner* — Matthew Smithers
(74) *Attorney, Agent, or Firm* — Bond, Schoeneck & King, PLLC

(57) ABSTRACT

A system and method for securely resolving an identity of an audio device. The method includes establishing a wireless connection between an audio device and a remote device. An identity resolving key (IRK) is received in an encrypted state from the audio device via the wireless connection. A data connection between the remote device and a server is established. The IRK is transmitted in the encrypted state to the server via the data connection. transmitting user credentials to the server via the data connection. The IRK is received in a decrypted state from the server via the data connection. An advertising packet broadcast from the audio device is received by the remote device. The advertising packet includes a random resolvable address for the audio device. The random resolvable address is attempted to be resolved using the IRK in the decrypted state to identify the audio device with remote device.

20 Claims, 3 Drawing Sheets

(56) References Cited

U.S. PATENT DOCUMENTS

| | | | |
|---|---|---|---|
| 7,916,877 B2 | 3/2011 | Goldberg et al. | |
| 7,917,082 B2 | 3/2011 | Goldberg et al. | |
| 8,023,663 B2 | 9/2011 | Goldberg | |
| 8,170,486 B2 | 5/2012 | Olofsson | |
| 8,391,792 B2 | 3/2013 | Glezerman et al. | |
| 8,433,243 B2 | 4/2013 | Sharma | |
| 8,706,038 B2 | 4/2014 | Sharma | |
| 8,768,252 B2 | 7/2014 | Watson et al. | |
| 8,923,747 B2 | 12/2014 | Tan et al. | |
| 9,191,988 B2 | 11/2015 | Newham | |
| 9,544,689 B2 | 1/2017 | Fisher et al. | |
| 9,756,461 B1* | 9/2017 | Hu | H04W 4/20 |
| 9,801,059 B2* | 10/2017 | Ziv | H04W 12/06 |
| 9,820,323 B1 | 11/2017 | Young et al. | |
| 2009/0154739 A1 | 6/2009 | Zellner | |
| 2009/0238375 A1 | 9/2009 | Pilati et al. | |
| 2010/0284389 A1 | 11/2010 | Ramsay et al. | |
| 2012/0087503 A1 | 4/2012 | Watson et al. | |
| 2013/0259230 A1* | 10/2013 | Polo | H04L 63/0272 380/270 |
| 2013/0279715 A1 | 10/2013 | Tan | |
| 2014/0105396 A1* | 4/2014 | Engelien-Lopes | H04W 12/04 380/270 |
| 2015/0350865 A1* | 12/2015 | Conn | H04W 8/005 455/41.2 |
| 2016/0073347 A1* | 3/2016 | Michaud | H04W 52/0229 370/252 |
| 2016/0095047 A1 | 3/2016 | Lee et al. | |
| 2016/0157078 A1* | 6/2016 | Palin | H04W 8/005 455/41.2 |
| 2017/0083284 A1 | 3/2017 | Fisher et al. | |
| 2017/0372600 A1* | 12/2017 | Palin | G06F 3/0484 |
| 2018/0172664 A1* | 6/2018 | Love | A61B 5/0026 |
| 2018/0198752 A1* | 7/2018 | Zhang | H04L 61/2076 |
| 2019/0108324 A1* | 4/2019 | Graube | H04L 9/3231 |
| 2019/0356485 A1* | 11/2019 | Young | H04L 9/3228 |
| 2019/0373469 A1* | 12/2019 | Bradley | H04W 8/005 |

OTHER PUBLICATIONS

International Search Report and the Written Opinion of the International Searching Authority, International Application No. PCT/US2019/029915, pp. 1-17, dated Jun. 17, 2019.

Argenox; A BLE Advertising Primer; Argenox Technologies LLC; 2016; Website available at: http://www.argenox.com/a-ble-advertising-primer/.

KBA_BT_0201: Bluetooth advertising data basics; Silicon Laboratories; Feb. 10, 2017; Website available at: https://www.silabs.com/community/wireless/bluetooth/knowledge-base.entry.html/2017/02/10/bluetooth_advertisin-hGsf.

Abraham; Understanding Bluetooth Advertising Packets; Jun. 4, 2017; Website available at: http://j2abro.blogspot.com/2014/06/understanding-bluetooth-advertising.html?m=1.

Warne; Bluetooth Low Energy—It starts with Advertising; Feb. 15, 2017; Website available at: https://blog.bluetooth.com/bluetooth-low-energy-it-starts-with-advertising.

Lindh; Bluetooth® low energy Beacons; Texas Instruments Application Report; Jan. 2015; Available at: http://www.ti.com/lit/an/swra475a/swra475a.pdf.

* cited by examiner

SECURE SYSTEMS AND METHODS FOR RESOLVING AUDIO DEVICE IDENTITY USING REMOTE APPLICATION

BACKGROUND

The disclosure relates to wireless audio systems and related devices and methods, and, particularly, to secure systems and methods for resolving the identity of an audio device with a remote application.

SUMMARY

All examples and features mentioned below can be combined in any technically possible way.

In one aspect, a method for securely resolving product identity includes establishing a wireless connection between an audio device and a remote device; receiving an identity resolving key (IRK) in an encrypted state from the audio device via the wireless connection; establishing a data connection between the remote device and a server; transmitting the IRK in the encrypted state to the server via the data connection; transmitting user credentials to the server via the data connection; receiving the IRK in a decrypted state from the server via the data connection; receiving an advertising packet broadcast from the audio device by the remote device, the advertising packet including a random resolvable address for the audio device; and attempting to resolve the random resolvable address using the IRK in the decrypted state to identify the audio device with remote device.

Examples may include the remote device comprising a first remote device having a first application and a second remote device having a second application; wherein establishing the wireless connection, receiving the IRK in the encrypted state, establishing the data connection, and transmitting the IRK in the encrypted state are performed by the first application; and wherein transmitting user credentials, receiving the IRK in the decrypted state, receiving the advertising packet, and resolving the random resolvable address are performed by the first application or the second application.

Examples may further include determining that the audio device is currently paired or has been previously paired to the remote device if the random resolvable address is resolved by the IRK.

Examples may further include updating a user interface displayed by the remote device to indicate the identity of the audio device.

Examples may further include determining that the audio device has not been paired to the remote device if the random resolvable address cannot be resolved by the IRK.

Examples may include the audio device having a first audio device and a second audio device, and the IRK includes a first IRK associated with the first audio device and a second IRK associated with the second audio device.

Examples may include performing the attempting with respect to each of the first audio device and the second audio device.

Examples may include the advertising packet arranged as a Bluetooth Low Energy (BLE) advertising packet.

Examples may include the random resolvable address included in a manufacturer specific data field of the BLE advertising packet.

Examples may include a periodically refreshed random number in the BLE advertising packet and the random resolvable address being received by the remote device as a first random resolvable address, and wherein the attempting includes retrieving the random number from the BLE advertising packet, generating a second random resolvable addresses with the remote device using the random number, and analyzing whether the first and second random resolvable addresses match.

Examples may further include completing an end-to-end authentication process between the audio device and the server, and wherein the encrypted state is achieved using a shared secret negotiated during the end-to-end authentication process.

Examples may include using the remote device as a relay between the audio device and the server.

Examples may further include generating the IRK by the audio device, generating the random resolvable address by the audio device using the IRK, and inserting the random resolvable address into the advertising packet.

In one aspect, a method for securely resolving product identity includes establishing a wireless connection between an audio device and a remote device having a first application installed thereon; receiving an identity resolving key (IRK) in an encrypted state from the audio device via the wireless connection; establishing a first data connection between the first application and a server; transmitting the IRK in the encrypted state to the server via the first data connection; transmitting user credentials to the server from the first application or from a second application via the first data connection; receiving the identity resolving key (IRK) in a decrypted state from the server by the first application or the second application; receiving an advertising packet from the audio device with the first or second applications, the advertising packet including a random resolvable address for the audio device; and resolving the random resolvable address using the IRK in the decrypted state to identify the audio device with the first or second applications.

In one aspect, a system for securely resolving product identity includes a remote device having a communication module with at least one wireless transceiver; wherein the remote device is configured to establish a wireless connection with an audio device and to receive an identity resolving key (IRK) in an encrypted state from the audio device via the wireless connection; wherein the remote device is configured to establish a data connection with a server, to transmit the IRK in the encrypted state and user credentials to the server via the data connection, and to receive the IRK in a decrypted state from the server; and wherein the remote device is further configured to receive an advertising packet from the audio device, the advertising packet including a random resolvable address for the audio device and to resolve the random resolvable address with the IRK in the decrypted state.

Examples may include the audio device having a first audio device and a second audio device, and the IRK includes a first IRK associated with the first audio device and a second IRK associated with the second audio device.

Examples may include the advertising packet arranged as a Bluetooth Low Energy (BLE) advertising packet.

Examples may include the random resolvable address included in a manufacturer specific data field of the BLE advertising packet.

Examples may include a periodically refreshed random number in the BLE advertising packet and the random resolvable address being received by the remote device as a first random resolvable address, and wherein the remote device is configured to retrieve the random number from the BLE advertising packet, to generate a second random resolvable addresses with the remote device using the random number, and to analyze whether the first and second random resolvable addresses match.

Examples may include the remote device having an application and the wireless connection includes a connection between the application and the audio device.

DETAILED DESCRIPTION

The present disclosure describes various systems and methods for resolving the identity of an audio device using a remotely installed connectivity and control application for the audio device.

An audio device (e.g., headset, speakers, audio eyeglasses and other wearable audio devices, etc.) may be associated with a user account, e.g., the first time that a user uses a connectivity and control application with the audio device (e.g., the application installed on a remote device such as a smartphone in communication with the audio device). The user account may be maintained by a cloud-based server owned or operated by a manufacturer of the audio device and/or the application. A second instance of the application (e.g., installed on a different remote device), after connecting to an established user account, may receive a list of audio devices already associated with that account. It may be desirable for the application to be able to reflect in its user interface (UI) whether any of the audio devices associated with the user's account are currently in range. Further, it may be desirable for the application to differentiate between audio devices already associated with the user's account and audio devices within range that are not associated with the user's account. It may also be desirable for the application to track the last time it saw an account-associated audio device, even if the audio device is not connected to the application.

Some or all of the above requirements could be satisfied by putting the MAC address or similar address of the audio device into the audio device's advertising packets, e.g., Bluetooth Low Energy (BLE) advertising packets. However the MAC address of the product is static uniquely identifying information that could be used by a third party BLE scanner to track the location of the audio device over time.

As discussed in more detail below, the audio device may be configured to obtain an identity resolving key (IRK) unique to the audio device, and to generate a random resolvable address from the IRK. The random resolvable address may be inserted into the BLE advertising payload broadcast by the audio device. The random resolvable address may be generated according to any desired technique or algorithm. In one example, the random resolvable address is a six-byte character string, in which the first half (three bytes) is a random number that is encrypted using the IRK. The IRK may be any desired length, such as a 128-bit key. The least significant three bytes of the encrypted output are used as the second half of the random resolvable address. The random seed from which the random number is generated may be refreshed over time (e.g., every few minutes) to avoid long term tracking.

Figure 1:
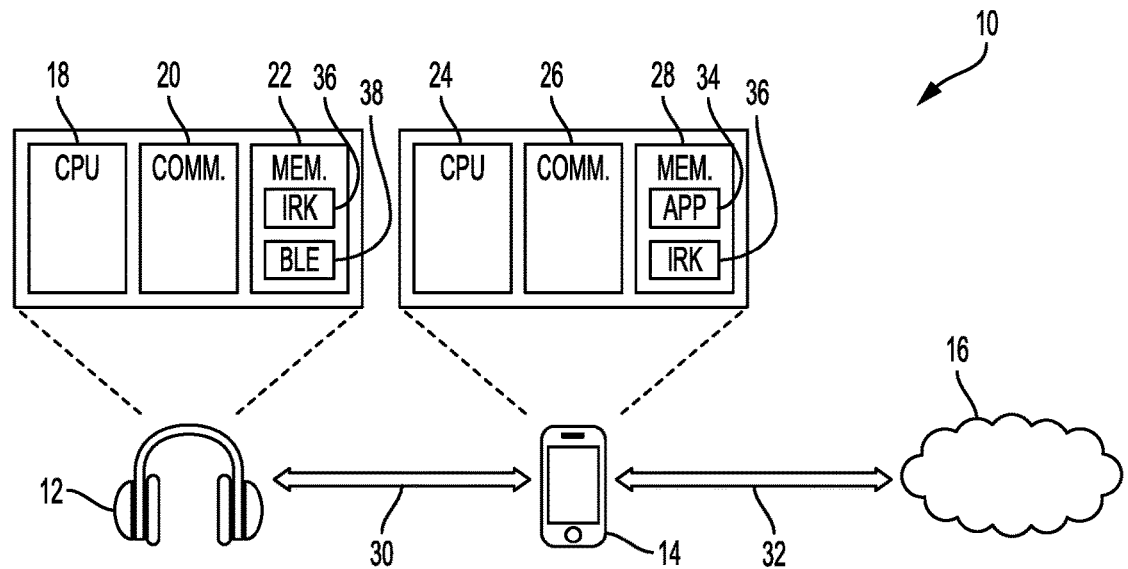
FIG. 1 schematically illustrates a system for resolving the identity of an audio device using an application installed on a remote device according to one example disclosed herein.

FIG. 1 depicts an audio system 10 that includes an audio device 12 and a remote device 14 for providing audio data to the audio device 12 and/or controlling certain operations of the audio device 12. The audio device 12 may include headphones (as shown in FIG. 1), a headset, earbuds, earpieces, speakers, eyeglasses, or any other device configured to produce sound from audio data. The remote device 14 may be or include any wireless-enabled audio source capable of transmitting audio data, such as a smartphone (as shown in FIG. 1), tablet, laptop, etc. The system 10 may also include a server 16, e.g., a network-, internet-, or cloud-based server, configured to facilitate secure transactions between the audio device 12 and the remote device 14, as discussed in more detail herein.

The audio device 12 may include a processor or CPU 18, a communication module 20, and a memory module 22, while the remote device 14 may include a processor or CPU 24, a communication module 26, and a memory module 28. It is to be appreciated that the server 16 may additionally include any combination of these or other computing resources (e.g., cloud-based computing resources). The processors 18 and 24 may each take any suitable form, such as a microcontroller, plural microcontrollers, circuitry, a single processor, or plural processors configured to execute software instructions.

The communication modules 20 and 26 are configured to establish a wireless connection 30 between the audio device 12 and the remote device 14. The communication modules 20 and 26 may be any module, device, transceiver, radio, or means capable of enabling the transmission and/or reception of a wireless communication signal. In one example, the communication modules 20 and 26 each include a radio frequency antenna coupled with a Bluetooth chipset. The communication module 26 is additionally configured to establish a data connection 32 with the server 16, and may utilize any wired or wireless technology (or combinations thereof), including but not limited to Wi-Fi (e.g., IEEE 802.11), Bluetooth, cellular, Ethernet, etc. For example, the data connection 32 may be established over the internet using any number of network devices or infrastructure.

The memory modules 22 and 28 may each take any suitable form or forms, including volatile memory, such as random access memory (RAM), or non-volatile memory such as read only memory (ROM), flash memory, a hard disk drive (HDD), a solid state drive (SSD), or other data storage media. The memory modules 22 and 28 may be used by the processors 18 and 24, respectively, for the temporary storage of data during their operation. Data and software, such as the algorithms or software necessary to perform the methods and provide the functionality discussed herein, as well as an operating system, firmware, or other application, may be installed in the memory modules 22 and 28.

The remote device 14 includes an application 34 stored in the memory module 28 that facilitates and/or controls connection with, transmission to, and/or control of the audio device 12. In one example, the application 34 includes the Bose® Connect application. The wireless connection 30 may include multiple connections, e.g., over different channels or according to different protocols. In one example, the wireless connection includes an application layer connection for the application 34 to the audio device 12. For example, the connection 30 may include a classic Bluetooth connection between the audio device 12 and the remote device 14, as well as a BLE connection that utilizes mobile application part (MAP) protocols. Since the application 34 is installed on the remote device 14, it is to be appreciated that functionality, operational steps, etc. attributed to the remote device 14 may generally include use of the application 34, and that functionality, operational steps, etc., attributed to the application 34 may be carried out by physical components of the remote device 14. For example, the various different protocols, channels, technologies, etc. used by the connection 30 may all be initiated by the application 34 and/or established by the same physical layer components, e.g., the communication module 26.

The audio device 12 is associated with a corresponding identity resolving key (IRK) 36 (or "product IRK 36"). The identity resolving key 36 may include any string of characters that can be used to generate and resolve a random resolvable address according to any encryption technique or methodology, such as Advanced Encryption Standard (AES). In one example, the product IRK 36 is a 128-bit key intended for use with AES-128. The product IRK 36 may be obtained by the application 34 for storage in the memory module 22 in any desired manner. For example, in one example, the audio device 12 is configured to generate the product IRK 36, e.g., using the processor 18 and a corresponding algorithm stored in the memory module 22. Generation of the product IRK 36 may occur, for example, at first-time boot-up or factory reset, after which the product IRK 36 is saved in non-volatile storage in the memory module 22. In another example, the audio device 12 is configured to request the product IRK 36 from the server 16, e.g., utilizing the remote device 14 as a relay, as discussed in more detail herein. The product IRK 36 may alternatively be generated and assigned to the audio device 12 by manufacturing equipment during the manufacturing process for the audio device 12.

The audio device 12 is configured to use the product IRK 36 to generate (e.g., with the processor 18) a corresponding random resolvable address for the audio device 12. In accordance with examples discussed in more detail below, the random resolvable address for the audio device 34 may be stored in the memory module 22, such as in the payload of an advertising packet 38 or other publicly broadcast data. As also discussed in more detail below, the audio device 12 is configured to transmit the product IRK 36 to the application 34 so that the application 34 can later identify whether it has previously connected to the audio device 12.

Figure 2:
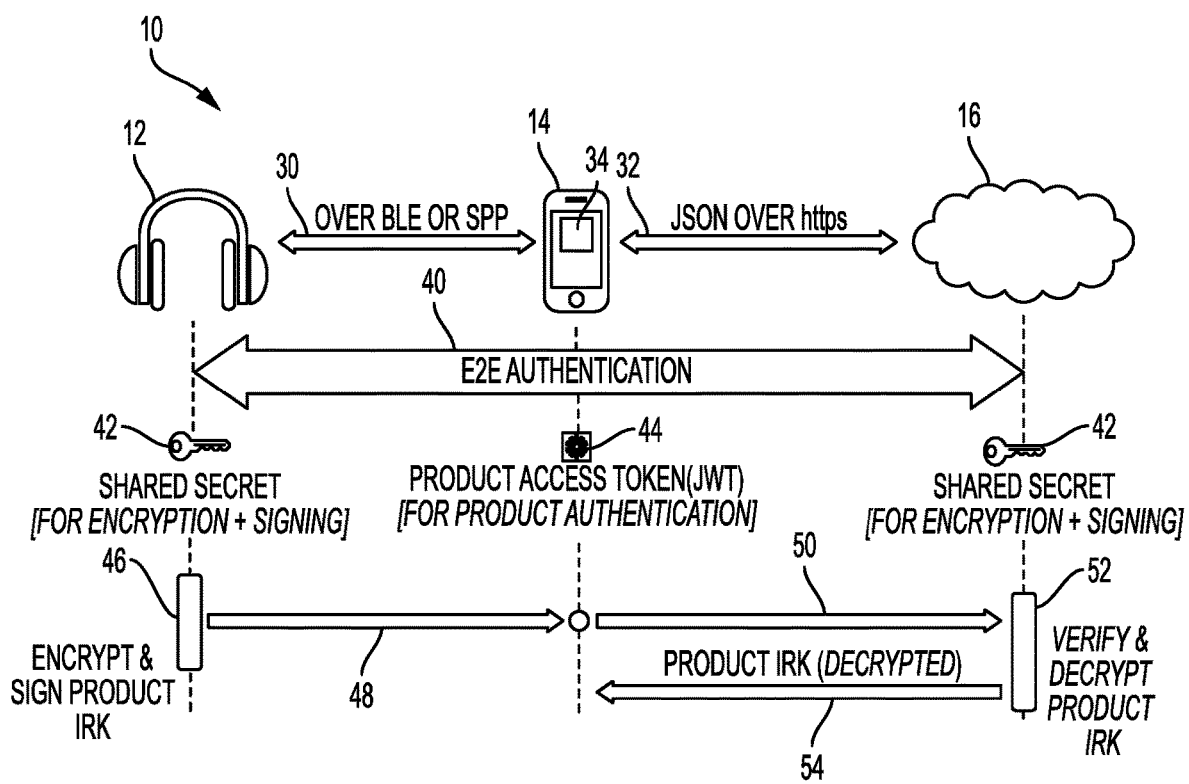
FIG. 2 illustrates a flow chart for securely transmitting an identity resolving key from an audio device to an application of a remote device according to one example disclosed herein.

If the audio device 12 and the remote device 14 are securely paired together, e.g., via Bluetooth Low Energy (BLE) specifications, the application 34 may transfer the product IRK 36 directly over the connection 30. However, if increased security is desired, the server 16 may be utilized. One method of using the server 16 to provide increased security while transmitting the product IRK 36 from the application 34 to the audio device 12 is illustrated in FIG. 2. In this example, the wireless connection 30 may include an application layer connection established by the application 34 via any applicable protocol over a BLE and/or Serial Port Profile (SPP) connection, while the data connection 32 may be established via JavaScript Object Notation (JSON) over a secure hypertext transfer protocol (HTTPS). Those of ordinary skill in the art will recognize other protocols, standards, specifications, and/or technology that may be used to establish and/or transfer data over the connections 30 and 32.

In the example of FIG. 2, it is assumed that the server 16 is an authentication server, e.g., owned or operated by the manufacturer of the audio device 12. In this way, when the application 34 first connects to the audio device 12, the audio device 12 can be authenticated as genuine by the server 16 via an end-to-end (E2E) authentication process 40. Authentication may be accomplished using pre-established unique identifier for the audio device 12, such as a globally unique identity (GUID), as well as public and private key pairs, which are known to the server 16 and the audio device 12. For example, the GUID and key pair may be generated as part of the manufacturing process for the audio device 12 and distributed to the server 16 and the audio device 12.

As part of the E2E authentication process 40, the server 16 may complete handshaking according to a pre-established process (e.g., using the GUID and key pair, as noted above) that results in the exchange of a shared secret 42 with the audio device 12. For example, the shared secret 42 may be an encryption key that enables communications between the audio device 12 and the server 16 to be securely encrypted, decrypted, and/or signed. Since the communications are encrypted by the shared secret 42, which is securely known by the audio device 12 and the server 16, the remote device 14 can be securely used as a relay to transfer encrypted communications. As an additional step, the user may be required to enter user credentials to the server 16, such as a user name and password, in order to authorize the remote device 14 and/or the application 34 to act as a relay. This may generate an access token 44 that is returned to the application 34, e.g., a JSON Web Token if JSON is employed for the data connection 32, and which may be used for future authentications.

At step 46 in FIG. 2, the audio device 12 encrypts and/or signs the product IRK 36, e.g., using the shared secret 42 negotiated in the E2E authentication process 40. At step 48, the encrypted version of the product IRK 36 is sent to the application 34. The application 34 may then forward the encrypted product IRK 36 to the server 16 with a request to verify and decrypt the IRK 36 at step 50. At step 52, the encrypted product IRK 36 is decrypted and/or the signature is verified, e.g., using the shared secret 42. At step 54, the product IRK 36 (in decrypted state) is sent to the application 34. It is noted that even though the product IRK 36 is sent in a decrypted state, the transmission may be made over an encrypted link to maintain security. In one example, the step 54 is only implemented if the user has provided appropriate authenticating credentials to the server 16 (e.g., as discussed above with respect to the access token 44). The decrypted product IRK 36 may then be stored in the memory module 28. The remote device 14 may use the product IRK 36 to generate a random resolvable address for the audio device 12.

The random resolvable address generated by the audio device 12 for itself using the product IRK 36 may be included in data publicly broadcasted by the audio device 12, such as inserted into the BLE advertising packets broadcast by the audio device 12. An example of the BLE advertising packet 38 (stored in the memory module 22 of the audio device 12, as noted above) is illustrated in more detail FIG. 3. The random resolvable address generated using the product IRK 36 may be stored in a publicly accessible field of the advertising packet 38, such as a manufacturer specific data field 56.

Figure 3:
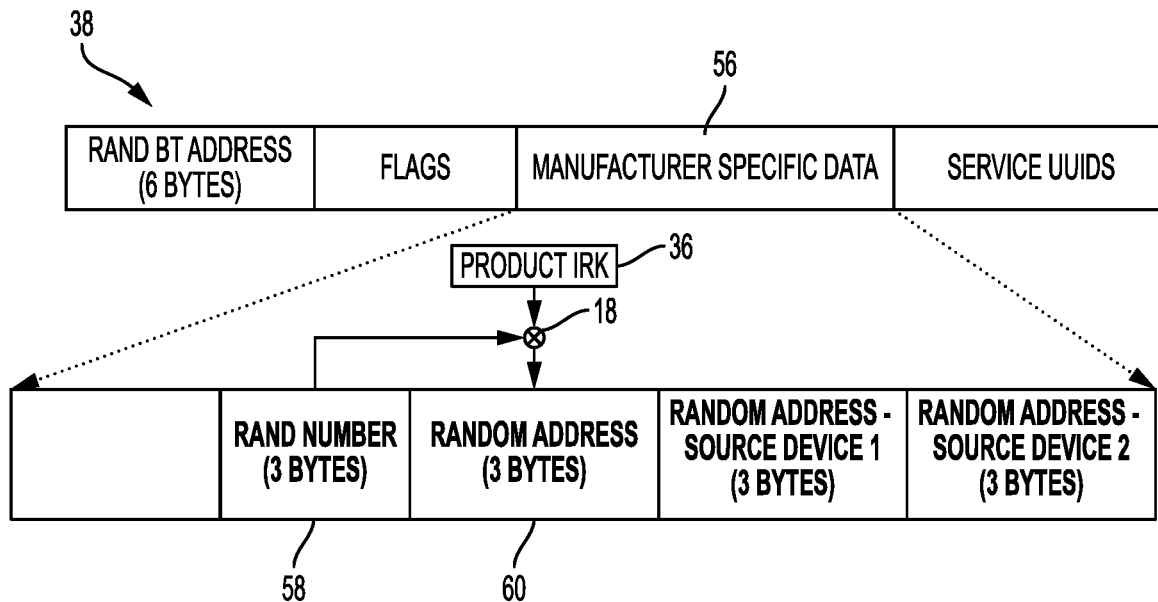
FIG. 3 schematically illustrates an advertising packet and manner of generating a random resolvable address and inserting it into a field of the advertising packet according to one example disclosed herein.

Data entries in the manufacturer specific data field 56 may include a random number 58 and a random resolvable address 60 associated with the audio device 12. In addition to the contents of the advertising packet 38, FIG. 3 schematically illustrates how the audio device 12 may generate the random resolvable address 60 for entry into the data field 56. That is, the generation of the random resolvable addresses 60 may be achieved by retrieving the random number 58, and encrypting the random number 58 with the corresponding product IRK 36, e.g., via the processor 18 of the audio device 12. The random number 58 may be refreshed periodically, e.g., every few minutes, with a new randomly derived number. In this way, the random resolvable address 60 for the audio device 12 may be generated by the audio device 12, stored in the corresponding section of the data field 56, and continuously broadcast with the BLE advertising packet 38. The random resolvable address 60 can correspondingly be updated periodically, e.g., each time the random number 58 is refreshed. As noted above, those of ordinary skill in the art will appreciate other methods for generating a random number and/or random resolvable address.

Figure 4:
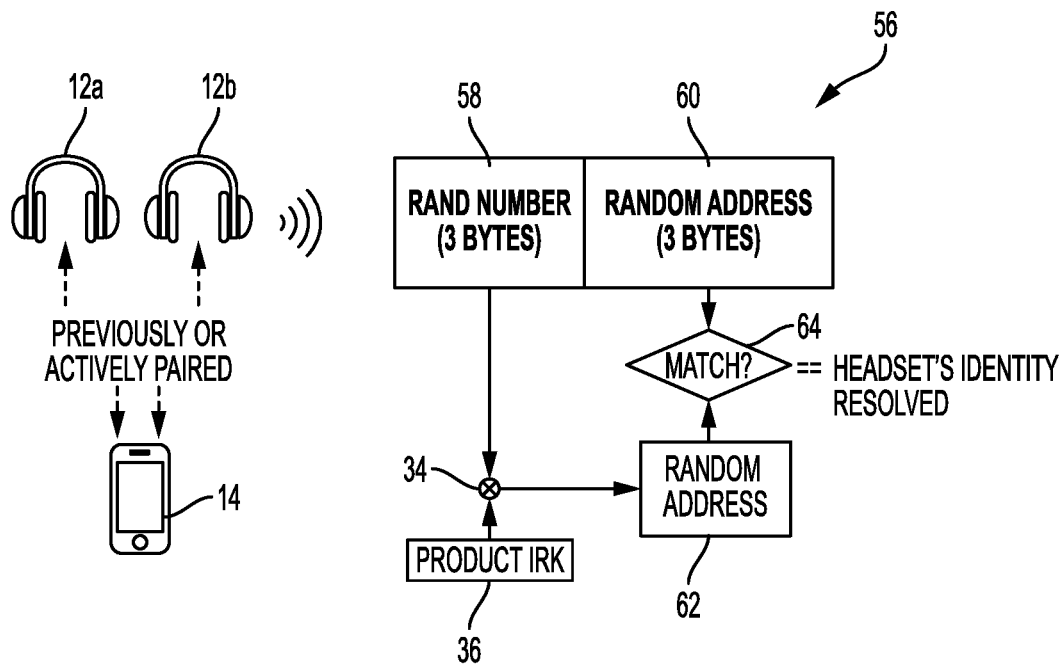
FIG. 4 is a block diagram illustrating a method and system for resolving the identities of audio devices using an application installed on a remote device according to one example disclosed herein.

The random resolvable address 60 may be used by the application 34 to resolve the identity of each audio device within communication range of the remote device 14, whether or not they have been previously paired to the remote device 14 and/or the application 34. As shown in FIG. 4, a first audio device 12a and a second audio device 12b are both in communication with the remote device 14, e.g., the remote device 14 and/or the application 34 are receiving the BLE advertising packets 38 broadcast by each of the audio devices 12a and 12b. It is noted that a different instance of the product IRK 36 would be stored in memory for each audio device that pairs with the application 34. For example, a first product IRK may be stored in the memory module 28 corresponding to the first audio device 12a and a second product IRK may be stored in the memory module 28 corresponding to the second audio device 12b if both the audio devices 12a and 12b were at some point connected to the remote device 14.

The application 34 may be configured to, for each nearby broadcasting audio device, retrieve the random number 58 from the field 56 of the received BLE advertising packet 38 broadcast from each audio device 12. For example, this may include retrieving a first random number for the first audio device 12a and a second random number for the second audio device 12b. In this way, any number of random numbers can be retrieved for any number of nearby broadcasting audio devices. Using the product IRKs 36 previously stored in the memory 28 (e.g., a first product IRK for the first audio device 12a, a second product IRK for the second audio device 12b, etc.) and the random numbers 58, the application 34 may generate one or more random resolvable address 62 (e.g., using the processor 24). For example, the random resolvable address 62 may include a random resolvable address for each combination of stored product IRK and retrieved random number.

The random resolvable address 60 can be retrieved from the data field 56 of each BLE advertising packet 38 received by the application 34 and compared to each instance of the random resolvable address 62. For each pair of the random resolvable addresses 60 and 62 that match, then the identity of the audio device corresponding to the matching pair of random resolvable addresses is resolved (i.e., the application 34 can determine the identity of the audio device by the product IRK corresponding to the instance of the random resolvable address 62 in the matching pair). If any of the random resolvable addresses 60 do not match one of the random resolvable addresses 62, then the application 34 can determine that the audio device corresponding to each unmatched instance of the random resolvable address 60 has not been previously paired to the application 34. The user interface of the application 34 can be updated to provide the identities of the identified audio devices, as well as to indicate which nearby broadcasting audio devices have not been previously paired with the application 34.

Figure 5:
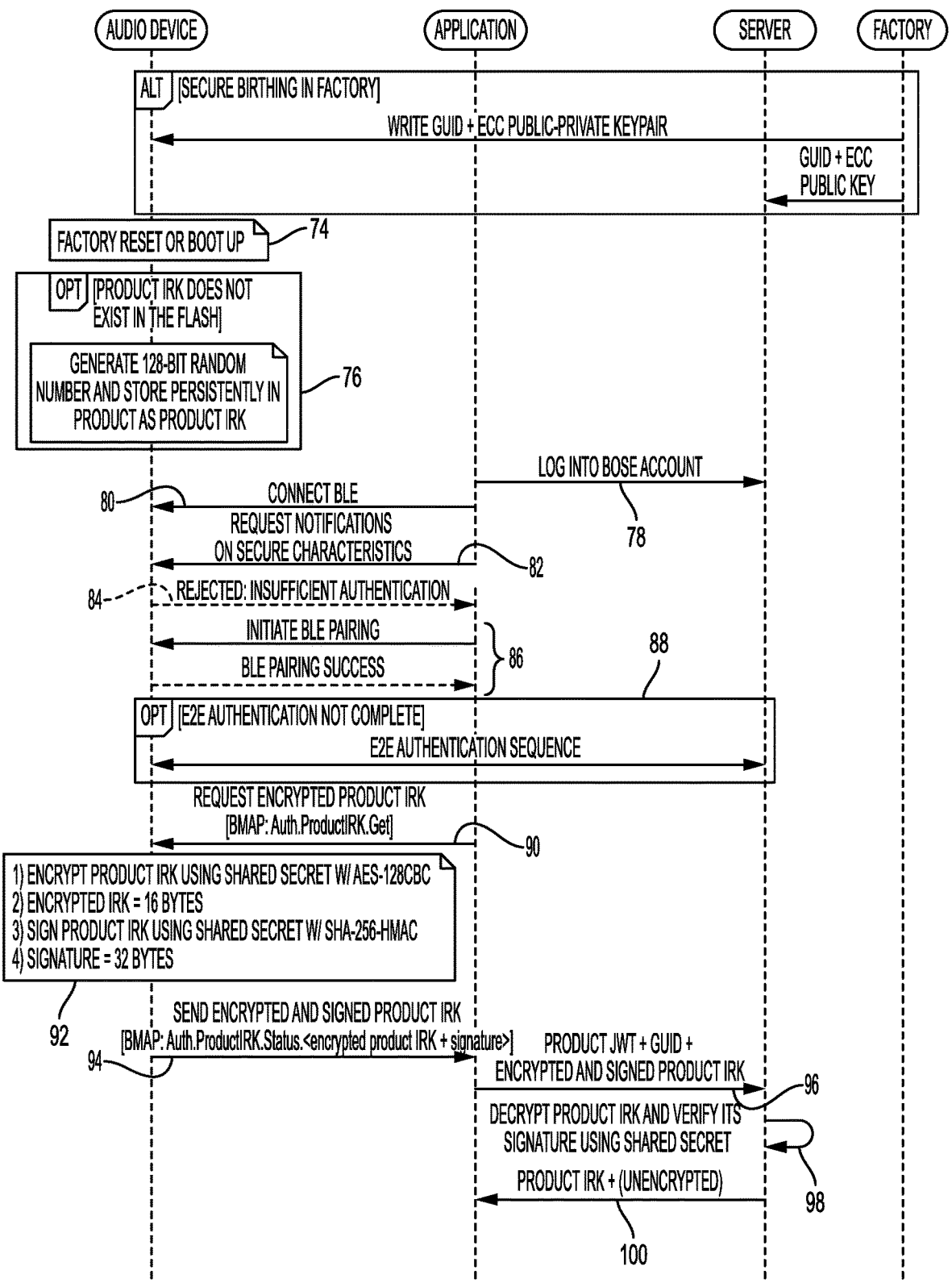
FIG. 5 is sequence diagram illustrating a method for resolving the identities of audio devices using an application installed on a remote device according to one example disclosed herein.

A sequence diagram describing a method 70 for securely resolving the identity of nearby broadcasting audio devices using an application installed on the remote device is illustrated in FIG. 5. At step 72, one or more audio devices (e.g., the audio devices 12, 12a, 12b) are manufactured, which may include sending a globally unique identity (GUID) and public-private key pair to the corresponding audio device and to an authentication server (e.g., the server 16). The key pair may be generated according to any cryptographic methodology, such as elliptic-curve cryptography (ECC). At step 74, each audio device may undergo a first-time boot-up or factory reset. Step 74 may trigger step 76, in which an identity resolving key for the audio device is generated (e.g., the product IRK 36), e.g., as a 128-bit random number, and/or in any manner described herein.

At step 78, the user of an application (e.g., the application 34) for remotely connecting to and/or controlling the audio device may provide authentication credentials to the authentication server. For example, this may include the user entering a user name and password to log into or access an account or user profile managed by the authentication server. The user may also use the application to initiate a connection, e.g., a BLE connection, to the audio device at a step 80 and/or to request notifications over a Generic Attribute Profile (GATT) characteristics requiring encryption at step 82. The audio device may reject the requests at step 84 due to insufficient authorization. Next, the application may initiate a BLE pairing at step 86. If additional authorization is required, an end-to-end authentication sequence (e.g., according to the E2E authentication process 40) may be carried out between the audio device and the server at step 88. The application may be approved as a relay during this process due to providing the credentials in step 78, or may need to resubmit the necessary credentials.

At step 90, the application may request the audio device's IRK, e.g., in encrypted form. The audio device may encrypt and/or sign its IRK at step 92, e.g., using a shared secret (e.g., the shared secret 42) negotiated during the E2E authentication sequence of step 88. The encryption and signature with the shared secret may use AES-128 or any other desired cryptographic technique. The signature may be created in accordance with SHA-256-HMAC or any other desired methodology. The encrypted and/or signed product IRK is then sent to the application at step 94.

At step 96, the encrypted and signed product IRK is forwarded from the application to the authentication server. The step 96 may include sending an access token (e.g., the access token 44) generated by the server for providing requisite credentials, e.g., in the step 78. The access token may be a JSON Web Token (JWT) if JSON is utilized to establish communication between the application and the server. The server decrypts and verifies the product IRK at step 98 and returns it (in unencrypted form) to the application at step 100. As noted with respect to step 54, even though the product IRK is sent in a decrypted state, the transmission may be made over an encrypted link to maintain security, e.g., thereby preventing interception from malicious third parties. The method 70 can be repeated as necessary for any number of different audio devices. Thereafter, e.g., as discussed with respect to FIG. 4, the application is able to in the future resolve the identity of each previously-paired audio device based on the contents of the audio device's BLE advertising packet or other broadcasted data.

It is noted that additional instances of the application can log into the same account (e.g., complete step 78) and be provided with all of the product IRKs for audio devices paired with other instances of the application. In this way, the application on any remote device can identify audio devices in range associated with a particular user's account. Advantageously, the application can reflect in its user interface each audio device in range that was previously-paired to any instance of an application associated with the user's account without including static uniquely identifying information in the audio device's BLE advertising packet (which may compromise a user's privacy by enabling the audio device's location to be tracked over time).

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A method for securely resolving product identity, comprising:
    establishing a wireless connection between an audio device and a remote device;
    receiving an identity resolving key (IRK) in an encrypted state from the audio device via the wireless connection;
    establishing a data connection between the remote device and a server;
    transmitting the IRK in the encrypted state to the server via the data connection;
    transmitting user credentials to the server via the data connection;
    receiving the IRK in a decrypted state from the server via the data connection;
    receiving an advertising packet broadcast from the audio device by the remote device, the advertising packet including a random resolvable address for the audio device; and
    attempting to resolve the random resolvable address using the IRK in the decrypted state to identify the audio device with remote device.

2. The method of claim 1, wherein the remote device comprises a first remote device having a first application installed thereon and a second remote device having a second application installed thereon;
    wherein establishing the wireless connection, receiving the IRK in the encrypted state, establishing the data connection, and transmitting the IRK in the encrypted state are performed by the first application; and
    wherein transmitting user credentials, receiving the IRK in the decrypted state, receiving the advertising packet, and resolving the random resolvable address are performed by the first application or the second application.

3. The method of claim 1, further comprising determining that the audio device is currently paired or has been previously paired to the remote device if the random resolvable address is resolved by the IRK.

4. The method of claim 3, further comprising updating a user interface displayed by the remote device to indicate the identity of the audio device.

5. The method of claim 1, further comprising determining that the audio device has not been paired to the remote device if the random resolvable address cannot be resolved by the IRK.

6. The method of claim 1, wherein the audio device includes a first audio device and a second audio device, and the IRK includes a first IRK associated with the first audio device and a second IRK associated with the second audio device.

7. The method of claim 6, wherein the attempting is performed with respect to each of the first audio device and the second audio device.

8. The method of claim 1, wherein the advertising packet is a Bluetooth Low Energy (BLE) advertising packet.

9. The method of claim 8, wherein the random resolvable address is included in a manufacturer specific data field of the BLE advertising packet.

10. The method of claim 8, wherein a periodically refreshed random number is included in the BLE advertising packet and the random resolvable address is received by the remote device as a first random resolvable address, and wherein the attempting includes retrieving the random number from the BLE advertising packet, generating a second random resolvable addresses with the remote device using the random number, and analyzing whether the first and second random resolvable addresses match.

11. The method of claim 1, further comprising completing an end-to-end authentication process between the audio device and the server, and wherein the encrypted state is achieved using a shared secret negotiated during the end-to-end authentication process.

12. The method of claim 11, wherein completing the end-to-end authentication process comprises using the remote device as a relay between the audio device and the server.

13. The method of claim 11, further comprising generating the IRK by the audio device, generating the random resolvable address by the audio device using the IRK, and inserting the random resolvable address into the advertising packet.

14. A method for securely resolving product identity, comprising:
- establishing a wireless connection between an audio device and a remote device having a first application installed thereon;
- receiving an identity resolving key (IRK) in an encrypted state from the audio device via the wireless connection;
- establishing a first data connection between the first application and a server;
- transmitting the IRK in the encrypted state to the server via the first data connection;
- transmitting user credentials to the server from the first application or from a second application via the first data connection;
- receiving the identity resolving key (IRK) in a decrypted state from the server by the first application or the second application;
- receiving an advertising packet from the audio device with the first or second applications, the advertising packet including a random resolvable address for the audio device; and
- resolving the random resolvable address using the IRK in the decrypted state to identify the audio device with the first or second applications.

15. A system for securely resolving product identity, comprising:
- a remote device having a communication module with at least one wireless transceiver;
- wherein the remote device is configured to establish a wireless connection with an audio device and to receive an identity resolving key (IRK) in an encrypted state from the audio device via the wireless connection;
- wherein the remote device is configured to establish a data connection with a server, to transmit the IRK in the encrypted state and user credentials to the server via the data connection, and to receive the IRK in a decrypted state from the server; and
- wherein the remote device is further configured to receive an advertising packet from the audio device, the advertising packet comprising a random resolvable address for the audio device and to resolve the random resolvable address with the IRK in the decrypted state.

16. The system of claim 14, wherein the audio device comprises a first audio device and a second audio device, and the IRK includes a first IRK associated with the first audio device and a second IRK associated with the second audio device.

17. The system of claim 14, wherein the advertising packet is a Bluetooth Low Energy (BLE) advertising packet.

18. The system of claim 16, wherein the random resolvable address is included in a manufacturer specific data field of the BLE advertising packet.

19. The system of claim 16, wherein a periodically refreshed random number is included in the BLE advertising packet and the random resolvable address is received by the remote device as a first random resolvable address, and wherein the remote device is configured to retrieve the random number from the BLE advertising packet, to generate a second random resolvable addresses with the remote device using the random number, and to analyze whether the first and second random resolvable addresses match.

20. The system of claim 14, wherein the remote device comprises an application and the wireless connection includes a connection between the application and the audio device.

* * * * *